(12) United States Patent
Gerrese et al.

(10) Patent No.: US 11,836,760 B1
(45) Date of Patent: Dec. 5, 2023

(54) VEHICLE ADVERTISING PLATFORM

(71) Applicant: GM Cruise Holdings LLC, San Francisco, CA (US)

(72) Inventors: Alexander Willem Gerrese, San Francisco, CA (US); Jennifer Devar McKnew, San Francisco, CA (US); Livia Johanna, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 17/856,670

(22) Filed: Jul. 1, 2022

(51) Int. Cl.
  *G06Q 30/00* (2023.01)
  *G06Q 30/0251* (2023.01)
  *G05B 19/418* (2006.01)

(52) U.S. Cl.
  CPC ..... *G06Q 30/0265* (2013.01); *G06Q 30/0267* (2013.01)

(58) Field of Classification Search
  CPC ................. G06Q 30/0265; G06Q 30/0267
  See application file for complete search history.

(56) References Cited

U.S. PATENT DOCUMENTS

| | | | | |
|---|---|---|---|---|
| 10,783,559 | B1* | 9/2020 | Tran | G09F 9/00 |
| 2016/0332535 | A1* | 11/2016 | Bradley | G08B 21/24 |
| 2021/0380126 | A1* | 12/2021 | Liu | G05D 1/0088 |

OTHER PUBLICATIONS

"Towards a multi-screen interactive ad delivery platform". IEEE. 2017 (Year: 2017).*
Ad-me wireless advertising adapted to the user location, device and emotions. IEEE. 2004. (Year: 2004).*
"Advertising in the IoT Era: Vision and Challenges". IEEE. 2018. (Year: 2018).*

* cited by examiner

*Primary Examiner* — Maria V Vanderhorst
(74) *Attorney, Agent, or Firm* — Akona IP PC

(57) ABSTRACT

Systems and methods for targeted advertisements displayed on a vehicle. A dynamic advertising platform leverages various ridehail service modalities to present targeted advertisements to users and bystanders. The modalities can include ridehail applications, external vehicle screens, interior vehicle screens, and other in-car experience formats. The targeted advertisements can be selected based on various factors, which can be personalized based on the user as well as based on the advertising business's preferences.

20 Claims, 7 Drawing Sheets

100

VEHICLE ADVERTISING PLATFORM

BACKGROUND

1. Technical Field

The present disclosure generally relates to vehicle advertisements, more specifically, to a dynamic advertising platform for vehicles.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, among others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

Autonomous vehicles can be used to provide rides to passengers for various types of errands and outings. While driving around a city, autonomous vehicles can display advertisements on exterior screens such that the advertisements are visible to other road users and passersby. However, many of the advertisements displayed on exterior screens may be of little interest to the person viewing the advertisement.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
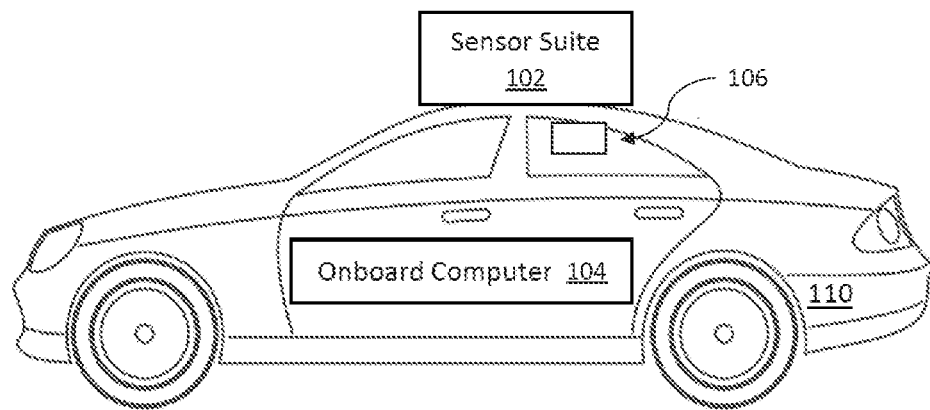
FIG. 1 illustrates an example of an autonomous vehicle, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Systems and methods are provided for targeted advertisements displayed in and on a vehicle. In particular, a dynamic advertising platform is provided that leverages various ridehail service modalities to present targeted advertisements to users and bystanders. Ridehail services can include rideshare services and delivery services. The modalities can include ridehail applications, external vehicle screens, interior vehicle screens, and other in-car experience formats. The targeted advertisements can be selected based on various factors, which can be personalized based on the user as well as based on the advertising business's preferences.

There are two general categories of advertising that most advertisements fall into: digital advertisements and physical advertisements. Digital advertisements include advertisements displayed on a digital medium, such as in a mobile device application, on an Internet site, on a social media site, during a television show or movie, embedded in emails, sent via text messages, or otherwise displayed on a screen. Digital advertisements can be specifically targeted to the viewer based on past user online behavior. Additionally, digital advertisements are relatively inexpensive (i.e., low cost per person who views the advertisement). However, engagement (by the user) with digital advertisements is typically low, since the advertisements are often displayed at an inconvenient time. For instance, people often do not want to engage with an advertisement when it blocks or delays a core experience such as watching a video or scrolling through online content. Additionally, it is difficult for businesses that are not delivery based (i.e., businesses that need in person visits) to drive physical traffic via digital advertisements, and thus these businesses are generally at a disadvantage based on digital advertising.

Physical advertisements are generally static, and include billboards, magazine advertisements, and posters. Physical advertisements can be strategically placed to reach users at more opportune times, such as a billboard for a nearby fast food restaurant on the highway. However, because physical advertisements are static, the advertisements cannot be hyper-targeted or directly engaged with by viewers. Thus, the barrier to engaging with a brand is much higher with a physical advertisement than a digital one, where a click is all that is needed. Additionally, engagement with physical advertisements cannot be measured directly, so it can be difficult to determine how much business is due to a physical advertisement.

Systems and methods are provided that integrate various aspects of digital and physical advertisements to provide targeted advertisements in and on vehicles. The targeted advertisements can be provided on exterior screens of a vehicle, on interior screens of a vehicle, and via other modalities, such as an audio advertisement or an advertisement presented via a mobile application. In some examples, advertisements that have passed within the vicinity of a user are tracked and associated with the user's ridehail application. In some implementations, targeted advertisements are selected based on the proximity of potentially interested ridehail users.

Example Autonomous Vehicle for a Dynamic Advertising Platform

FIG. 1 is a diagram of an autonomous driving system 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 includes systems and methods for providing targeted advertisements in and on the vehicle 110. In some examples, the vehicle 110 includes a dynamic advertisement component 106 that presents targeted advertisements to users and bystanders. In particular, the dynamic advertisement component 106 selects targeted advertisements and provides the targeted advertisements to an output component 108, which can be one or more of interior vehicle screens, exterior vehicle screens, interior vehicle speakers, exterior vehicle speakers, other vehicle output devices, and/or user mobile devices.

The sensor suite 102 includes localization and driving sensors. For example, the sensor suite may include one or more of photodetectors, cameras, radio detection and ranging (RADAR), sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment. As described in greater detail below, information about the autonomous vehicle's environment as detected by the sensor suite 102 can include a number of nearby bystanders and ridehail user applications of nearby bystanders. The information can be used to identify targeted advertisements for presentation in and/or outside the vehicle 110. Additionally, sensor suite 102 data can provide localized traffic information. In this way, sensor suite 102 data from many autonomous vehicles can continually provide feedback to the mapping system and the high fidelity map can be updated as more and more information is gathered. In some examples, the advertisement modification system provided herein can use information gathered by other autonomous vehicles in the fleet, for example information in the mapping system, for identifying advertisements and determining advertisement content, as described in greater detail below.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some examples, the dynamic advertisement component 106 receives processed sensed sensor suite 102 data from the onboard computer 104. In some examples, the dynamic advertisement component 106 receives sensor suite 102 data from the sensor suite 102. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, a bicycle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Targeted Content

Figure 2:
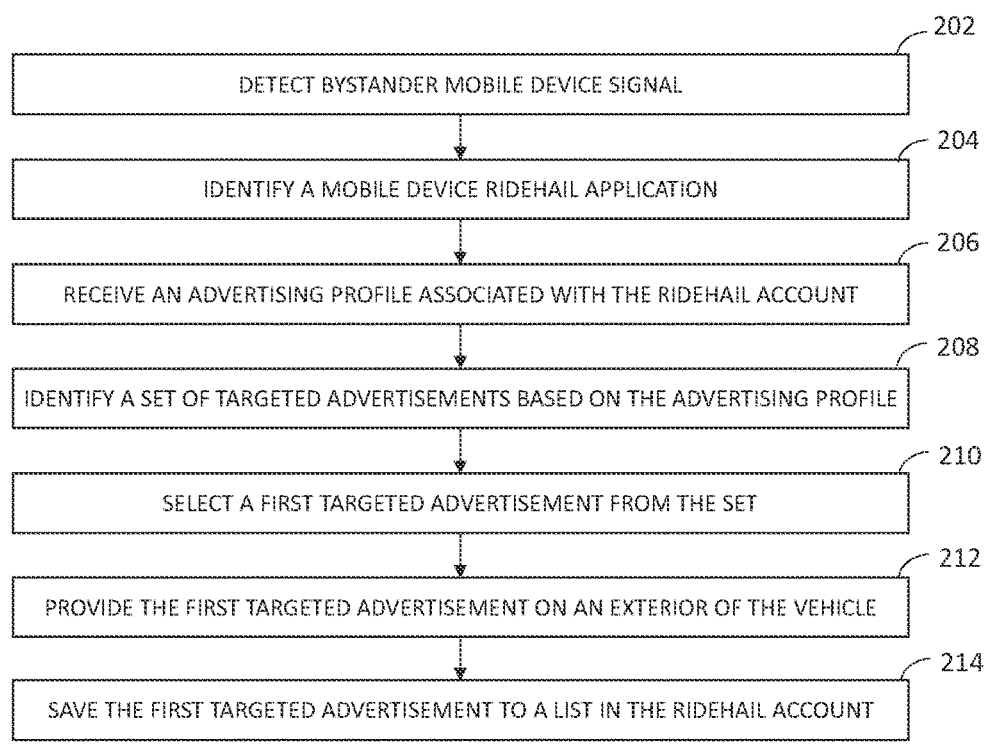
FIG. 2 illustrates a method for targeted advertising on a vehicle, according to some examples of the present disclosure.

FIG. 2 illustrates a method 200 for targeted content, according to some examples, of the present disclosure. In particular, the method 200 is a technique for presenting targeted content, such as advertisements, on a vehicle exterior to one or more bystanders in the vicinity of the vehicle. At step 202, one or more bystander mobile device signals are detected. In some examples, the mobile device signals are detected at the vehicle. In other examples, the mobile device signals are detected at a cell tower or other receiver, and the mobile device location is communicated with the vehicle. In some examples, the mobile device signals are received at a central computer for a ridehail service. The signals can include cellular signals, ultrawide band (UWB) signals, BLUETOOTH® signals, radio signals, short range communication signals, or any other type of signals. In some examples, the mobile device signals are transmitted from a mobile device ridehail application.

At step 204, a ridehail application on the mobile device is identified, and the ridehail account is identified. In particular, in various implementations, the ridehail application settings on a mobile device can be set to allow the ridehail application to communicate with ridehail vehicles associated with the ridehail application service even when the user is not actively using the ridehail application. In some examples, ridehail vehicles communicate directly with ridehail applications to identify assigned users who are looking for their vehicle, and to indicate an incorrect vehicle to unassigned users. Similarly, the ridehail vehicles can communicate directly with a ridehail application for targeting advertisements to users. In some examples, the ridehail application on the mobile device communicates with a central computer, and the central computer communicates with one or more vehicles. The central computer can communicate a location of the mobile device having the ridehail application with the vehicle.

At step 206, a content presentation profile associated with the ridehail account is received at the vehicle. The content presentation profile can include an advertising profile, and it can be used to identify and/or determine selected content to be presented to the user. The content presentation profile can also be used to identify selected content to avoid presenting to the user. In some examples, the content presentation profile is received from the ridehail application on the mobile device. In other examples, the identified ridehail application from step 204 and the associated user account identification information is transmitted from the vehicle to a central computer, and the content presentation profile associated with the user account is received from the central computer. In some examples, the ridehail application communicates with the central computer, the central computer has location information and associated user account identification information for the ridehail application mobile device, and the central computer transmits the content presentation profile to vehicles in the vicinity of the mobile device location. In some examples, the vehicle receives the content presentation profile from the central computer before the vehicle has detected the mobile device signal at step 202 and/or before the vehicle has identified the ridehail account associated with the ridehail application on the mobile device.

The content presentation profile can include general information used for targeted advertisements such as age range, gender, and other personally provided information. The content presentation profile can include data regarding advertisements that the user has previously viewed. Additionally, the content presentation profile can include data regarding advertisements with which the user has previously engaged (e.g., through the ridehail application, via a screen inside a ridehail vehicle during a ride, or as otherwise detected during a ridehail vehicle ride). In some examples, the content presentation profile can include data gathered from other mobile device applications, such as the Internet or social media applications. Additionally, the content presentation profile can include advertisements a user has viewed or been exposed to in the environment. In some examples, mapping data and/or image sensor data can be used to determine the of a particular advertisement in the environment. It can then be determined whether the user has viewed the advertisement using the techniques discussed herein (e.g., gaze tracking, user interaction, and/or another method).

There are many factors that can be considered in generating the content presentation profile for a user. One factor is the user's ride history. The user's previous drop-off and pick-up locations can be used to suggest places that are similar to places the user has previously visited. For instance, if a user stops at an ice cream shop on a weekly basis, before the user's next ice cream shop visit, an advertisement for a different ice cream shop may be presented to the user. Similarly, if a user frequently visits a particular fast food establishment for lunch, an advertisement for a different fast food establishment may be presented to the user before lunchtime. In other examples, the user's previous drop-off and pick-up locations can be used to suggest places that are completely different from places the user has previously visited, helping the user explore new experiences.

Another factor that can be considered in generating the content presentation profile for a user is the user's previous purchases delivered via the ridehail delivery service. For example, if a user has previously purchased chocolates from a local boutique, this data can be stored in the user's content presentation profile. Furthermore, if the user has previously purchased from a selected business and subsequently left a poor review for the selected business, the content presentation profile can include intelligently avoiding advertisements for the selected business. Similarly, if the user has previously purchased from a selected business and subsequently returned the item(s) purchased, the content presentation profile can include intelligently avoiding advertisements for the selected business. Additionally, a user's content presentation profile can be updated based on purchases made during a ridehail service ride. Thus, the content presentation profile can be updated to include data learned from the user's previous purchases, package deliveries, and/or returns. In some examples, a neural network can be trained to generate a profile for a user based on a user's ridehail ride and/or delivery history, and/or other information available about the user.

At step 208, a set of targeted advertisements for the user associated with the ridehail account is identified, based on the content presentation profile. In various implementations, the ridehail service can have a set of potential advertisements from businesses that have agreed to advertise through the ridehail service vehicles, and the set of targeted advertisement is selected from the set of potential advertisements (i.e., the set of targeted advertisements is a subset of the set of potential advertisements). Thus, if the content presentation profile indicates that the user has previously engaged with advertisements for coffee shops, and the set of potential advertisements includes a local coffee shop advertisement, the local coffee shop advertisement may be identified as one of the set of targeted advertisements. Similarly, if the content presentation profile indicates that the user has previously engaged with advertisements for sports clothing, and the set of potential advertisements includes a local sports shop advertisement, the sports shop advertisement may be identified as one of the set of targeted advertisements. Similarly, the content presentation profile information can be generated from data collected inside an autonomous vehicle, for example using sensors that determine if the user has previously looked at particular content while riding in an autonomous vehicle and/or if a user clicks "like" on content displayed on a tablet in an autonomous vehicle. In another example, if the content presentation profile indicates the user identifies as a woman between the ages of 25-35, and the set of potential advertisements includes an advertisement directed to women in this age range, the advertisement may be identified as one of the set of targeted advertisements. In some examples, profiles of similar users can be used to generate the content presentation profile.

In various examples, advertisements can be selected based on the location of the vehicle (and the location of the advertised business, or a location where an advertised product can be purchased), the time of day, the age of potential viewers, and the proximity of potentially interested ridehail users. In some examples, the vehicle's current location (e.g., neighborhood, market, street) can be used to ensure that a business's advertisement campaign reaches the target audience. For instance, the location can be used to ensure that viewers of the advertisement are close enough to the physical store that an advertisement is actionable by bystanders (e.g., a local gym advertisement for a free group class at 2 pm is actionable to bystanders within a certain distance of the gym at a time before the class begins). Additionally, the location-based advertising system can be used to communicate locally important information much like a moving bulletin board. Locally important information can include street cleaning, trash day reminders, local events (e.g., farmers markets, park concerts, etc.), and disaster awareness (e.g., weather warnings and/or watches, such as "stay inside and stay hydrated until the extreme heatwave subsides").

In some examples, when a vehicle drives within the vicinity of a selected business, the sensor data can be used to choose an advertisement for the selected business that includes an offer with a short time window until expiration. In one example, if a user has passed by a fitness center twenty times, when the user is about to pass the fitness center or is passing the fitness center, an advertisement can be displayed with an offer to join for 50% off an annual membership within the next 30 minutes. In various examples, the user can be inside a vehicle and passing the fitness center and the advertisement can be displayed in the vehicle. In some examples, the user can be walking past the fitness center and a nearby vehicle can display the advertisement on an exterior screen.

In some examples, the time of day is considered in selecting an advertisement, such that businesses can ensure that their target audience is reached at the optimal time. For instance, a bakery may prefer to advertise its fresh baked bread in the morning and dessert offerings in the afternoon. Similarly, a local wine bar might want to advertise its happy hour in the afternoon and evening.

In some examples, the proximity of potentially interested ridehail application users can be considered in selecting a targeted advertisement. For instance, the most common interests of nearby ridehail application users can be inferred to select the most likely advertisement to succeed in any selected scenario. In some examples, the most common interests of nearby ridehail application users can be inferred based on each user's content presentation profile, trip history, and/or past engagement with advertisements. In various examples, businesses can target users by interest based on users' content presentation profiles, and businesses can choose to have their advertisement displayed when a selected threshold of ridehail application users in a specific area is reached.

In some examples, image recognition technology can be used to estimate ages of nearby bystanders, and advertisements can change based on the estimated ages, to cater to the audience. For instance, if a vehicle is passing a group of schoolchildren, the vehicle advertisement can switch from an alcohol advertisement to a toy advertisement. In various examples, vehicle image sensors are used to collect image data and a vehicle perception stack analyzes collected image data to estimate ages of nearby bystanders. In addition to image sensors, other vehicle sensors capture information about the environment outside the vehicle, including LIDAR and RADAR sensors. In particular, in addition to camera images, the targeted advertisement system can use LIDAR point clouds, radar feeds, and ultraprecise GPS coordinates. The vehicle can continuously and/or repeatedly capture images of the environment outside the vehicle, as the environment around the vehicle can be constantly changing as the vehicle moves and as objects (e.g., people, animals, and other vehicles) move around the vehicle.

At step 210, a first targeted advertisement is selected from the set of targeted advertisements. In some examples, if the set of targeted advertisements includes an advertisement for a nearby business, and the advertisement for the nearby business is selected based on the proximity of the business. In some examples, the selection of the targeted advertisement is random. In some examples, there is a goal number of presentations of an advertisement over a selected time period (e.g., per day), and the targeted advertisement is selected based on fulfilling the goal.

At step 212, the first targeted advertisement is provided on an exterior of the vehicle. In some examples, the first targeted advertisement is displayed on an exterior vehicle screen. For instance, the first targeted advertisement can be displayed on a screen on a side of the vehicle. In another example the vehicle windows are transparent screens, and the first targeted advertisement is displayed on a vehicle window. In some examples, the vehicle includes multiple exterior screens, and the first targeted advertisement is displayed on a screen that is in the ridehail application user's field of view. In some examples, a second screen (e.g., a screen on the opposite of the vehicle) displays a different targeted advertisement based on a different user's content presentation profile. In some examples, the advertisement is an audio advertisement presented via vehicle exterior speakers. For instance, the audio advertisement may suggest that the user visit a local bakery that is in the vicinity, and in some examples, the user can ride in the vehicle to the bakery.

At step 214, the first targeted advertisement is saved to a list of advertisements in the user's ridehail application profile. Thus, if a user is interested in the advertised product or business but does not have time or availability to engage with the advertisement when it is presented, the user can later visit the list of advertisements in the ridehail application to review products and businesses that were advertised to them. From the list of advertisements, the user can click on any advertisement of interest and, potentially, engage with the advertised business and/or product (e.g., visit the business website). Additionally, an option can be presented to a user to order a ride to a business location on the list with a single tap.

In addition to advertisements being provided outside the vehicle at step 212, advertisements can also be provided to users inside a vehicle during a ride based on the user's content presentation profile as described above. When an advertisement is presented inside a vehicle, a user can be provided an option to stop at an advertised business and/or to pick up an advertised product. In addition to advertisements being presented on screens, in some examples, product samples can be provided in a vehicle. In some examples, the samples offered can depend on a user's content presentation profile. For example, if a user has previously purchased chocolates from a local boutique, the boutique has provided samples to the ridehail service, and the samples are available in a selected subset of vehicles, the ridehail service can match the user with one of the selected subset of vehicles to increase the likelihood of the user trying the chocolate sample and purchasing the product. Similarly, when a user is inside a vehicle, a targeted advertisement can include an option of making an intermediate stop (or changing the final destination) and visiting the business. U.S. application Ser. No. 17/409,093 titled "Sample-Based Advertising Platform" discusses providing samples in a vehicle and is hereby incorporated by reference in its entirety.

In some implementations, the method 200 further includes determining a total number of bystanders who view the first targeted advertisement. In general, other bystanders and passersby may view the first targeted advertisement. Vehicle sensors, such as vehicle cameras, can be used to detect how many people see the first targeted advertisement. In particular, sensor data can be used by a vehicle perception stack for gaze tracking of people within a selected distance of the vehicle. Using gaze tracking, the perception stack can determine, for each detected person, whether the person views the first targeted advertisement. Gaze tracking includes identifying a person's eyes and tracking the direction of the person's gaze. In some examples, a physical advertising-tracking metric can be based on a cost-per-gaze, such that advertisers pay for exposure received (where exposure includes a person viewing the advertisement), rather than a certain number of advertisement presentations. In some examples, data regarding the number of people who look at the first targeted advertisement can be used as feedback to identify other targeted advertisements to display.

In some examples, the vehicle detects more than one mobile device signal at step 202, and identifies more than one mobile device ridehail applications and associated ridehail accounts at step 204. In some implementations, when multiple ridehail accounts are identified, the method 200 can identify a set of targeted advertisements for each identified ridehail account, and determine if any of targeted advertisements in each of the sets of targeted advertisements is included in multiple sets of targeted advertisements. In some examples, the targeted advertisement that is included in the most number of sets of targeted advertisements can be selected at step 210.

In some examples, the advertising experience changes depending on user context and/or mood. For example, when an advertisement is presented to a user inside a vehicle, based on interior vehicle sensor data, a user's context and/or mood is determined. For instance, sensor data can be used to detect that a user is tired and/or sleeping, and advertising content can be presented based on the user state. In one examples, if a user's eyes are closed, interior screens may display no advertising content. Similarly, if multiple users in a vehicle are engaged in conversation, interior displays may not display content.

Figure 3:
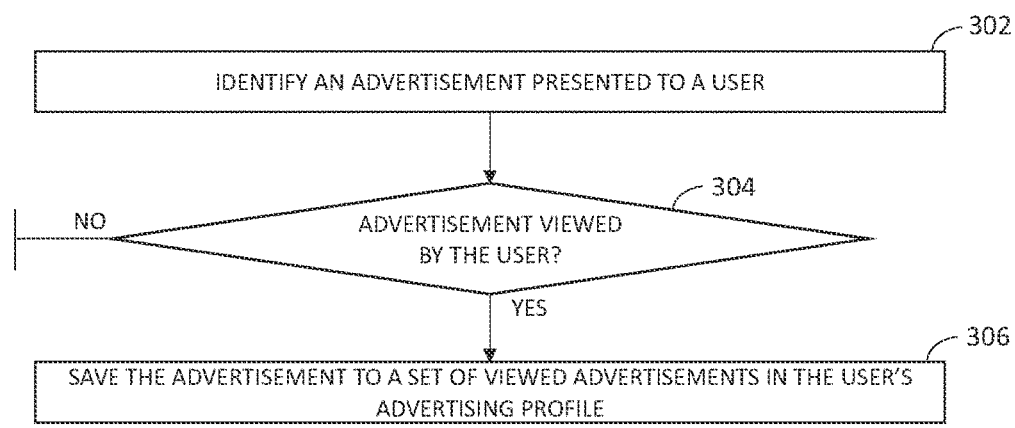
FIG. 3 illustrates another method for targeted advertising, according to some examples of the present disclosure.

FIG. 3 illustrates another method 300 for targeted advertising, according to some examples, of the present disclosure. In particular, the method 300 focuses on developing the content presentation profile for a ridehail account. The method 300 associates advertisements that have been visible to a user to the user ridehail account. At step 302, an advertisement is identified that has been presented to a user. In various examples, the advertisement may have been presented on an exterior vehicle screen, on an interior vehicle screen, or on a ridehail application.

At step 304, it is determined whether the advertisement was viewed by the user. As described above, vehicle cameras and a vehicle perception stack can be used to determine whether the user viewed the advertisement. Sensor data can be used by the vehicle perception stack for gaze tracking of the user. Using gaze tracking, the perception stack can determine whether the user viewed the advertisement. Gaze tracking includes identifying the user's eyes and tracking the direction of the user's gaze.

If, at step 304, it is determined that the advertisement was viewed by the user, the method proceeds to step 306 and the advertisement is saved to a set of viewed advertisements in a content presentation profile of the user's ridehail account. The set of viewed advertisements can include engagement ratings for each advertisement. Engagement ratings can be based on a number of factors, such as how long a user spent looking at the advertisement and whether the user engaged with the content of the advertisement. Engagement with the advertisement can include loading linked content on the mobile device, saving an advertisement to the mobile device, and/or scheduling a ride to the advertised business.

If, at step 304, it is determined that the advertisement was not viewed by the user, the method 300 ends. The method 300 can be repeated multiple times, whenever a user is presented with advertisements.

There are many other ways that advertisements can be targeted to ridehail vehicle users, and a user's reaction to and/or interaction with various advertisements can be used to update the user's content presentation profile. When a user interacts with an advertisement, this can be included as user engagement with the advertisement. In some examples, businesses can advertise by being suggested destinations and/or intermediate stops in a user's ridehail application. For example, if a user searched for a nearby drive-through café or a local Mediterranean restaurant, a business can be promoted during the ride request (or intermediate stop flow) by appearing at the top of the search results in that category. Additionally, in some examples, a business can be proactively shown to the user (e.g., "[x store] is on the way home. Would you like to make a stop?"). In some examples, the ridehail application can allow users to order food or other items on the way to a particular location.

Another example of a way that advertisements can be targeted to ridehail vehicle users is upsells and/or additional product offerings at delivery. In some examples, users engage directly with vehicles to pick up deliveries and businesses can upsell and/or offer additional products at the point of sale. Similarly, when users are in a vehicle to a ridehail destination, businesses can upsell and/or offer additional products. For instance, when a user is picking up a lunch delivery, an extra soft drink and/or dessert can be offered for a reduced price to encourage the user to try the additional item.

In some examples, immersive branding experiences can be used to advertise various businesses and/or products, using various vehicle features. Similar to branded lenses and filters on mobile device camera, video, and messaging applications, businesses can offer engaging experiences that augment a passenger's trip while providing a branding opportunity inside the vehicle using projector-based and/or augmented reality-enabled windows. For example, a city's natural history museum can craft an experience where life-size three-dimensional dinosaurs are running alongside the car. Interested parties can easily change their destination to the museum, add a stop, or save the destination for later. In some examples, branded experiences can be time-dependent, location-dependent, and/or context-dependent, and can include offers and additional incentives, such as a free ride to the business, discounts for ridehail service users, etc.

As discussed above, a vehicle can display targeted advertisements to bystanders and others outside a vehicle. Vehicles can include internal and external lights, and changing the lights can be a part of the targeted content. In some examples, a vehicle targets advertisements to a user who is scheduled to ride in the vehicle. Thus, before entering the vehicle, a user can see targeted advertisements on the vehicle external screens. Additionally, once inside the vehicle, the vehicle internal screens can also display targeted advertisements. Similarly, the ridehail application can display targeted advertisements. In some examples, after a user has entered a vehicle, the external vehicle advertisements are changed to provide content targeted at a different user and/or bystander.

Example Targeted Advertising Platform System

Figure 4:
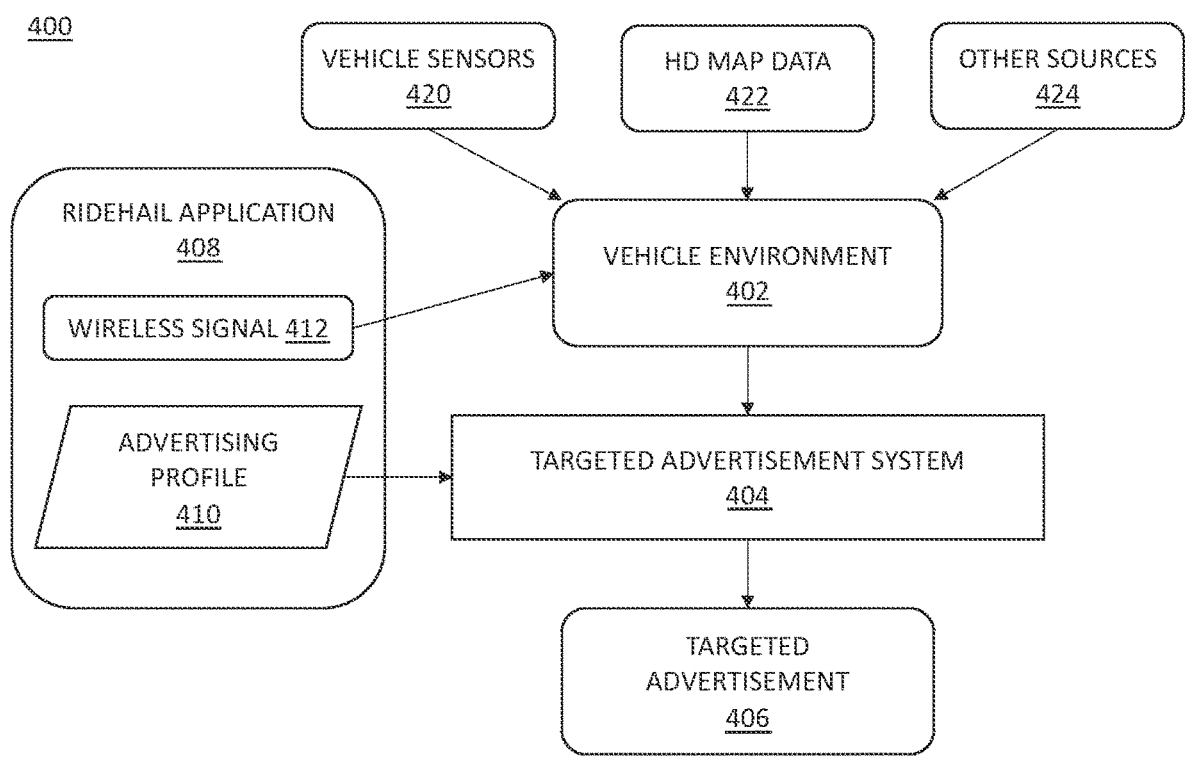
FIG. 4 illustrates an example of the inputs to a targeted advertisement system in a vehicle, according to some examples of the present disclosure.

FIG. 4 illustrates an example 400 of the inputs to a system 404 for targeted advertisement in a vehicle, according to some examples of the present disclosure. In particular, a vehicle environment 402 including any bystanders in the vehicle environment 402 is used by the targeted advertisement system 404 to identify bystanders, and generate targeted advertisements 406. The vehicle environment 402 is determined using several inputs. The inputs to the vehicle environment 402 include vehicle sensor data 420, map data 422, input from other sources 424, and, optionally, a wireless signal input 412 from a ridehail application 408 on a mobile device. The wireless signal input 412 can include a short range communication signal, a BLUETOOTH® signal, a radio wave signal, or other electromagnetic waves. The wireless signal input 412 can include ridehail/rideshare application 408 user account information. In some examples, there is no ridehail application 408 and/or wireless signal 412 in the vicinity of the vehicle, and thus, in these examples, the vehicle environment 402 input does not include a wireless signal 412.

The vehicle sensor data 420 includes data from vehicle cameras, LIDAR, radar, and other sensors. The vehicle map data 422 can include high definition, ultra-detailed maps used by the autonomous vehicle fleet for autonomous driving functions. In some examples, the vehicle map data 422 can include a location of the ridehail application 408, where the ridehail application 408 location is the location of the mobile device on which the ridehail application 408 is installed. The other sources of input from other sources 424 includes historical data, both data generated by autonomous vehicles and other data input to the system, 3D assets, including 3D models input into the system, as well as any other data sources. In some implementations, a central computer transmits data to the vehicle, such as nearby ridehail application account information, locations of nearby ridehail applications, and content presentation profiles corresponding to nearby ridehail applications. The autonomous vehicle environment 402 uses the various inputs to detect nearby bystanders, and, in some cases, identify nearby bystanders. Information about nearby bystanders is then input to the targeted advertisement system 404.

The targeted advertisement system 404 receives as input the vehicle environment 402, and, optionally, one or more content presentation profiles 410. The targeted advertisement system 404 generates a targeted advertisement 406. For the content presentation profile 410, in various examples, the content presentation profile is received from the ridehail application 408 on a mobile device. In other examples, the content presentation profile associated with the user account is received from a central computer. The content presentation profile can include general information used for targeted advertisements such as age range, gender, and other personally provided information. The content presentation profile can include data regarding advertisements that the user has previously viewed. Additionally, the content presentation profile can include data regarding advertisements with which the user has previously engaged (e.g., through the ridehail application, via a screen inside a ridehail vehicle during a ride, or as otherwise detected during a ridehail vehicle ride). In some examples, the content presentation profile can include data gathered from other mobile device applications, such as the Internet or social media applications. In some examples, the content presentation profile is based in part on user ride history and/or the user's previous purchases delivered via the ridehail delivery service.

Example Vehicle for a Targeted Content Presentation Platform

Figure 5:
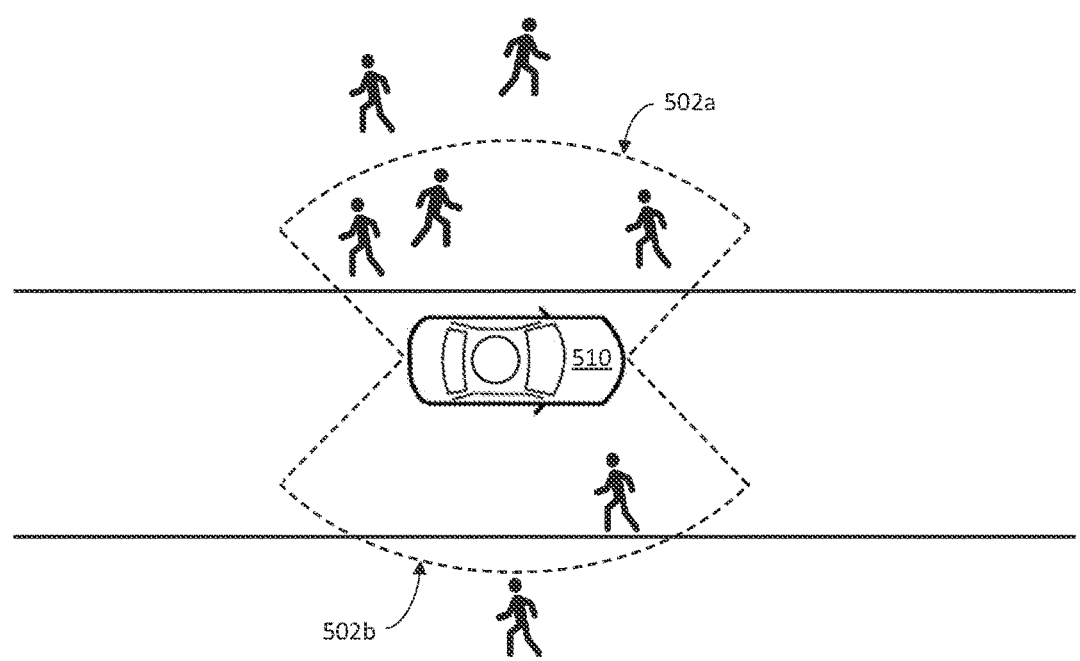
FIG. 5 illustrates an example of a vehicle and several bystanders, according to some examples of the present disclosure.

FIG. 5 illustrates an example of a vehicle 510 and several bystanders, according to various examples of the present disclosure. In particular, as shown in FIG. 5, there are multiple bystanders walking in the vicinity of the vehicle. The vehicle 510 can display targeted content, such as advertisements, to the bystanders, where the targeted content can be targeted in particular to one or more of the bystanders. In some examples, the vehicle 510 can slow down to display the content for a longer period of time. In one example, on the left side of the vehicle 510 (in the top portion of FIG. 5), the first area 502a is the area within which the vehicle 510 detects bystanders for targeted advertising. In various examples, the first area 502a can be any selected size. The first area 502a includes three bystanders. In some examples, the targeted content presentation platform on the vehicle 510 identifies various attributes of one or more of the bystanders in the first area 502a and selects a targeted advertisement for displaying on the left side of the vehicle based on the identified attributes. In some examples, the targeted content can include beamformed audio to a sensed location of a particular bystander. In some examples, the targeted content presentation platform targets the content to one of the bystanders who is walking toward the vehicle or in a direction such that the bystander is still predicted to walk by the vehicle. In some examples, an exterior display is visible from a selected direction, such that it is only visible to a bystander standing in a specific position, and not to all users on a selected side of the vehicle.

In some examples, one or more of the bystanders in the first area 502a has a mobile device with an active ridehail application, and the targeted advertising platform receives a content presentation profile for the ridehail application. The targeted advertising platform uses the content presentation profile to select a targeted advertisement, as discussed above with respect to FIGS. 2-4. Additionally, the targeted advertising platform can track the bystander's gaze to determine whether the bystander views the targeted advertisement.

In another example, on the right side of the vehicle 510 (in the bottom portion of FIG. 5), the second area 502b is the area within which the vehicle 510 detects bystanders for targeted advertising. The vehicle can include a second exterior screen on the right side of the vehicle, and attributes of bystanders in the second area 502b can be used to select the targeted advertisement for the second area 502b. In various examples, the second area 502b can be any selected size. The second area 502b includes one bystander. In some examples, the targeted advertising platform on the vehicle 510 identifies various attributes of the bystander in the second area 502b and selects a targeted advertisement for displaying on the left side of the vehicle based on the identified attributes. If the bystander in the second area 502b has a mobile device with an active ridehail account application, the targeted advertising platform on the vehicle 510 receives the content presentation profile for the ridehail account. The targeted advertising platform uses the content presentation profile to select a targeted advertisement, as discussed above with respect to FIGS. 2-4. Additionally, the targeted advertising platform can track the bystander's gaze to determine whether the bystander views the targeted advertisement.

Example Systems for a Targeted Content Presentation Platform

Figure 6:
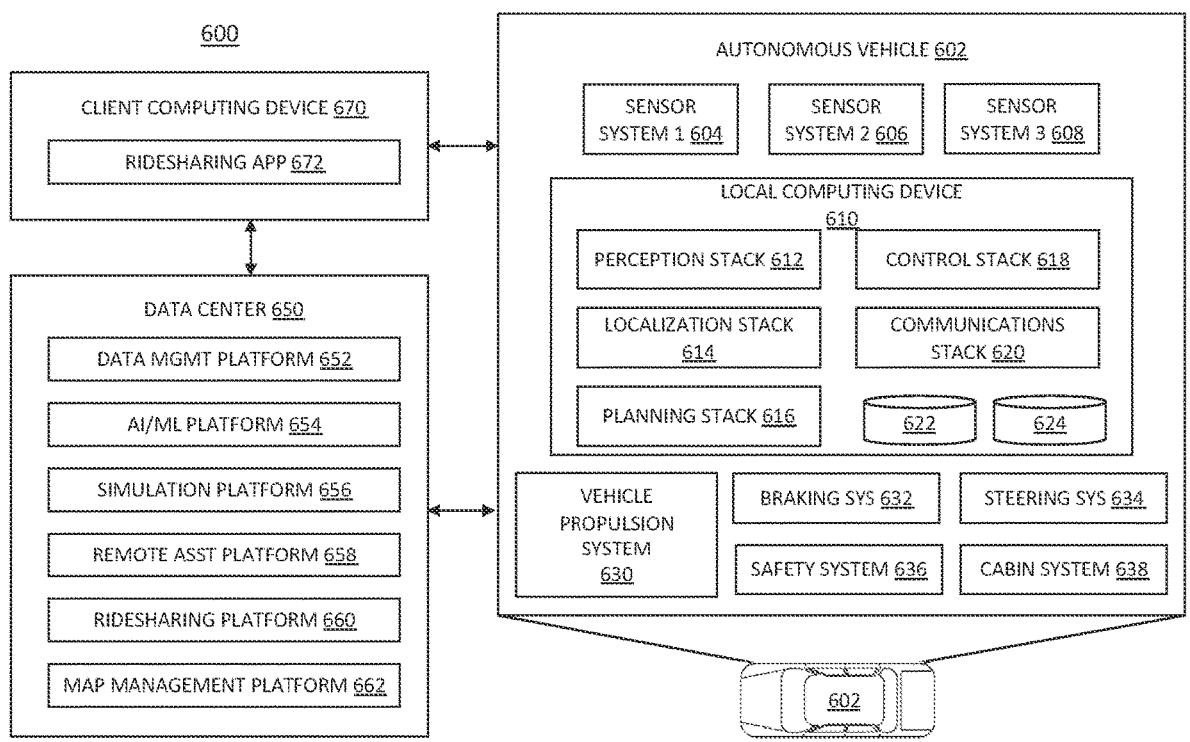
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise IMUs, cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., GPS receivers), audio sensors (e.g., microphones, SONAR systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth. In some examples, the perception stack 612 can be used to track the gaze of one or more bystanders. In some examples, the perception stack 612 can be used to locate bystanders. In some examples, the perception stack 612 can be used to profile bystanders.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), BLUETOOTH®, infrared, etc.). In some examples, the communication stack 620 can be used to locate bystanders, and in some examples, the communication stack 620 can be used to identify bystanders.

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point-cloud data, image or video data, RADAR data, GPS data, and other sensor data that the data center 650 can use for creating or updating AV geospatial data as discussed further below with respect to FIG. 6 and elsewhere in the present disclosure. In some examples, the data center 650 can include user profiles.

The data center 650 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point-cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
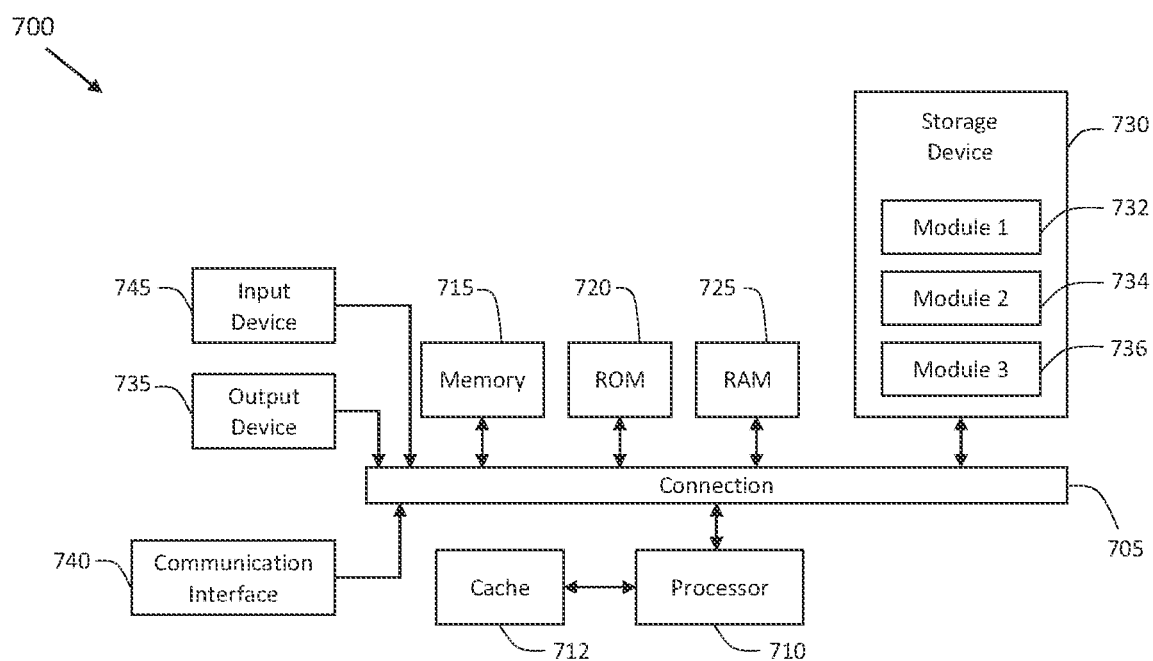
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. One or more of the services 732, 734, and 736 can include a targeted content presentation platform as described herein. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more GNSS receivers or transceivers that are used to determine a location of the computing system 700 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer-readable media which can store data that are accessible by a computer, such as magnetic cassettes, flash memory cards, solid-state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, RAM, Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general-purpose or special-purpose computer, including the functional design of any special-purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECTED EXAMPLES

Example 1 provides a method for targeted content on a vehicle, comprising: detecting a ridehail application within a selected distance of the vehicle; receiving a content presentation profile associated with the ridehail application; identifying a set of targeted advertisements from a plurality of current advertisements based on the content presentation profile; selecting a first targeted advertisement from the set of targeted advertisements; and providing the targeted advertisement on the vehicle.

Example 2 provides a method, system, and/or vehicle according to one or more of the preceding and/or following examples, further comprising saving the first targeted advertisement to an advertisement list in the ridehail application.

Example 3 provides a method, system, and/or vehicle according to one or more of the preceding and/or following examples, wherein receiving the content presentation profile includes receiving the content presentation profile from the ridehail application on a mobile device.

Example 4 provides a method, system, and/or vehicle according to one or more of the preceding and/or following examples, further comprising receiving user account identification data from the ridehail application, transmitting the user account identification data to a central computer, and receiving the content presentation profile associated with the user account identification data from a central computer.

Example 5 provides a method, system, and/or vehicle according to one or more of the preceding and/or following examples, wherein providing the targeted advertisement includes displaying the targeted advertisement on an exterior vehicle screen.

Example 6 provides a method, system, and/or vehicle according to one or more of the preceding and/or following examples, wherein the ridehail application is on a mobile device, and wherein detecting the ridehail application comprises detecting a selected wireless signal from the mobile device.

Example 7 provides a method, system, and/or vehicle according to one or more of the preceding and/or following examples, further comprising determining whether the first targeted advertisement was viewed by a person holding the mobile device.

Example 8 provides a method, system, and/or vehicle according to one or more of the preceding and/or following examples, further comprising determining a number of bystanders who view the targeted advertisement.

Example 9 provides a vehicle for providing targeted advertising, comprising: a sensor suite including external vehicle sensors to sense a vehicle environment including wireless signals and generate sensor data; a perception system to: receive the sensor data, and detect a ridehail application within a selected distance of the vehicle; and a targeted advertisement system to: receive a content presentation profile associated with the ridehail application, identify a set of targeted advertisements from a plurality of current advertisements based on the content presentation profile; select a first targeted advertisement from the set of targeted advertisements; and provide the first targeted advertisement on the vehicle.

Example 10 provides a method, system, and/or vehicle according to one or more of the preceding and/or following examples, wherein the targeted advertisement system is further to save the first targeted advertisement to the content presentation profile.

Example 11 provides a method, system, and/or vehicle according to one or more of the preceding and/or following examples, further comprising an external vehicle screen, and wherein the targeted advertisement system is to provide the first targeted advertisement on the external vehicle screen.

Example 12 provides a method, system, and/or vehicle according to one or more of the preceding and/or following examples, wherein the external vehicle sensors include image sensors, and wherein the perception system is to identify a user having a mobile device with the ridehail application based on the sensor data.

Example 13 provides a method, system, and/or vehicle according to one or more of the preceding and/or following examples, wherein the perception system is to track a gaze of the user and determine whether the first targeted advertisement was viewed by the user.

Example 14 provides a method, system, and/or vehicle according to one or more of the preceding and/or following examples, wherein the external vehicle sensors include wireless signal sensors to detect a wireless signal from a mobile device with the ridehail application.

Example 15 provides a method, system, and/or vehicle according to one or more of the preceding and/or following examples, wherein the external vehicle sensors include image sensors, and wherein the perception system is to determine a number of bystanders who view the targeted advertisement based on the sensor data.

Example 16 provides a system providing targeted advertising, comprising: a central computer to: receive a ridehail application location from a ridehail application, and transmit a content presentation profile associated with the ridehail application; and a vehicle including: a sensor suite including external vehicle sensors to sense a vehicle environment including wireless signals and generate sensor data; a perception system to: receive the sensor data, and detect the ridehail application within a selected distance of the vehicle; and a targeted advertisement system to: receive the content presentation profile associated with the ridehail application, identify a set of targeted advertisements from a plurality of current advertisements based on the content presentation profile; select a first targeted advertisement from the set of targeted advertisements; and provide the targeted advertisement on the vehicle.

Example 17 provides a method, system, and/or vehicle according to one or more of the preceding and/or following examples, wherein the targeted advertisement system is further to save the first targeted advertisement to the content presentation profile, generating an updated content presentation profile.

Example 18 provides a method, system, and/or vehicle according to one or more of the preceding and/or following examples, wherein the vehicle further includes an external vehicle screen, and wherein the targeted advertisement system is to provide the first targeted advertisement on the external vehicle screen.

Example 19 provides a method, system, and/or vehicle according to one or more of the preceding and/or following examples, wherein the perception system is to identify a user having a mobile device with the ridehail application based on the sensor data, and track a gaze of the user and determine whether the first targeted advertisement was viewed by the user.

Example 20 provides a method, system, and/or vehicle according to one or more of the preceding and/or following examples, wherein the targeted advertisement system is further to generate a list of viewed advertisements associated with the content presentation profile and transmit the list of viewed advertisements to the central computer.

Example 21 provide a method for associating advertisements viewed by a user with a user ridehail account, comprising: identifying a first set of advertisements presented to the user; determining whether each of the first set of advertisements was viewed by the user and generating a subset of viewed advertisements; and saving the subset of viewed advertisements in the user ridehail account.

Example 22 provides a method, system, and/or vehicle according to one or more of the preceding and/or following examples, wherein detecting a ridehail application within a selected distance of the vehicle includes detecting a wireless signal from a mobile device with the ridehail application at vehicle sensors.

Example 23 provides a method, system, and/or vehicle according to one or more of the preceding and/or following examples, wherein detecting a ridehail application within a selected distance of the vehicle includes determining a location of a mobile device with ridehail application at a central computer.

Example 24 provides an apparatus comprising means for performing the method of any of the previous examples.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method for targeted digital content on a vehicle, comprising:
    sensing, at a vehicle sensor suite, a vehicle environment including wireless signals and generating sensor data;
    detecting a mobile device signal from at least one mobile device within a selected distance of the vehicle;
    detecting a ridehail application on the at least one mobile device, wherein detecting the ridehail application comprises detecting a selected wireless signal from the at least one mobile device;
    identifying a ridehail account associated with the ridehail application;
    receiving a content presentation profile associated with the ridehail application and the ridehail account, wherein the content presentation profile is based on drop-off and pick-up locations of rides requested through the ridehail account and based on purchases delivered via a ridehail delivery service through the ridehail account;
    identifying, by a targeted advertisement system, a set of targeted advertisements from a plurality of current advertisements based on the content presentation profile;
    selecting, by the targeted advertisement system, a first targeted advertisement from the set of targeted advertisements;
    providing the first targeted advertisement on the vehicle;
    generating an engagement rating for the first targeted advertisement; and
    updating the content presentation profile using a neural network, including saving the first targeted advertisement and the engagement rating to a set of viewed advertisements in the content presentation profile.

2. The method of claim 1, further comprising saving the first targeted advertisement to the content presentation profile in the ridehail application.

3. The method of claim 1, further comprising receiving user account identification data from the ridehail application, transmitting the user account identification data to a central computer, and receiving, at an onboard computer on the vehicle, the content presentation profile associated with the user account identification data from a central computer.

4. The method of claim 1, wherein the set of targeted advertisements is a first set of targeted advertisements, wherein the content presentation profile is a first content presentation profile, and wherein providing the first targeted advertisement includes identifying a selected side of the vehicle visible to a first user associated with the at least one mobile device, and displaying the first targeted advertisement on an exterior vehicle screen on the selected side of the vehicle, and further comprising providing a second targeted advertisement on a second side of the vehicle, wherein the second side is different from the selected side, and wherein the second targeted advertisement is one of a second set of targeted advertisements from the plurality of current advertisements and the second set of targeted advertisements is based on a second content presentation profile of a second user.

5. The method of claim 1, further comprising slowing down the vehicle to increase a period of time the first targeted advertisement is provided, determining that the first targeted advertisement was viewed by a person holding the at least one mobile device, and adding the first targeted advertisement to the content presentation profile as viewed content.

6. The method of claim 1, wherein the ridehail application is a first ridehail application, the at least one mobile device is a first mobile device, and further comprising determining a number of bystanders who view the first targeted advertisement, and detecting at least one second ridehail application on at least one second mobile device associated with one of the bystanders.

7. The method of claim 1, further comprising communicating, by a vehicle perception system in the vehicle, with the ridehail application on the at least one mobile device when the vehicle service application is not in use.

8. The method of claim 1, wherein the mobile device signal is a first mobile device signal from a first mobile device, and wherein the content presentation profile is a first content presentation profile associated with a first ridehail account, and further comprising:
- detecting a second mobile device signal from a second mobile device,
- detecting a second ridehail account on the second mobile device,
- receiving a second content presentation profile associated with the second ridehail account,
- identifying similar attributes of the first and second content presentation profiles, and
- selecting the first targeted advertisement based on the similar attributes.

9. A vehicle for providing targeted content, comprising:
- a sensor suite including external vehicle sensors to sense a vehicle environment including wireless signals and generate sensor data;
- a perception system to:
  - receive the sensor data,
  - detect a mobile device signal from at least one mobile device within a selected distance of the vehicle,
  - detect a ridehail application on the at least one mobile device, wherein detecting the ridehail application comprises detecting a selected wireless signal from the at least one mobile device,
  - identify a ridehail account associated with the ridehail application,
  - receive a content presentation profile associated with the ridehail account and the ridehail application on the at least one mobile device, wherein the content presentation profile is based on drop-off and pick-up locations of rides requested through the ridehail account and based on purchases delivered via a ridehail delivery service through the ridehail account; and
- a targeted advertisement system configured to:
  - identify a set of targeted advertisements from a plurality of current advertisements based on the content presentation profile,
  - select a first targeted advertisement from the set of targeted advertisements, provide the first targeted advertisement on the vehicle;
- wherein the perception system is further configured to generate an engagement rating for the first targeted advertisement; and transmit updated content presentation profile information, including updated the set of viewed advertisements with the first targeted advertisement and the engagement rating.

10. The vehicle of claim 9, wherein the targeted advertisement system is further to save the first targeted advertisement to the content presentation profile.

11. The vehicle of claim 9, wherein the perception system is further configured to identify a first side of the vehicle visible to a first user associated with the at least one mobile device, and further comprising a first external vehicle screen on the first side of the vehicle and a second external vehicle screen on a second side of the vehicle, and wherein the targeted advertisement system is to provide the first targeted advertisement on the first external vehicle screen and further comprising providing a second targeted advertisement on the second external vehicle screen, wherein the second targeted advertisement is one of a second set of targeted advertisements from the plurality of current advertisements and the second set of targeted advertisements is based on a second content presentation profile of a second user.

12. The vehicle of claim 9, wherein the external vehicle sensors include image sensors and wireless signal sensors, and wherein the perception system is to identify a user having a mobile device with the ridehail application based on the sensor data.

13. The vehicle of claim 12, wherein the perception system is to track a gaze of the user and determine whether the first targeted advertisement was viewed by the user.

14. The vehicle of claim 9, wherein the external vehicle sensors include image sensors, and wherein the perception system is to determine a number of bystanders who view the first targeted advertisement based on the sensor data.

15. The vehicle of claim 9, wherein the mobile device signal is a first mobile device signal from a first mobile device, and wherein the content presentation profile is a first content presentation profile associated with a first ridehail account, and wherein the perception system is further configured to:
- detect a second mobile device signal from a second mobile device,
- detect a second ridehail account on the second mobile device,
- receive a second content presentation profile associated with the second ridehail account,
- identify similar attributes of the first and second content presentation profiles, and
- select the first targeted advertisement based on the similar attributes.

16. A system for providing targeted content presentation, comprising:
- a central computer to:
  - receive a ridehail application location from a ridehail application on a mobile device, and
  - transmit a content presentation profile associated with the ridehail application; and
- a vehicle including:
  - a sensor suite including external vehicle sensors to sense a vehicle environment including wireless signals and generate sensor data;
  - a perception system to:
    - receive the sensor data,
    - detect a mobile device signal from the mobile device within a selected distance of the vehicle, and detect the ridehail application on the mobile device wherein detecting the ridehail application comprises detecting a selected wireless signal from the mobile device, identify a ridehail account associated with the ridehail application, receive the content presentation profile associated with the ridehail application and the ridehail account from the central computer wherein the content presentation profile is based on drop-off and pick-up locations of rides requested through the ridehail account and based on purchases delivered via a ridehail delivery service through the ridehail account; and a targeted advertisement system to:

provide a targeted advertisement on the vehicle;

wherein the perception system is further configured to generate an engagement rating for the targeted advertisement; and wherein the central computer is further configured to update the content presentation profile using a neural network, including saving the targeted advertisement and the engagement rating to a set of viewed advertisements in the content presentation profile.

17. The system of claim 16, wherein the targeted advertisement is a first targeted advertisement, and wherein the central computer is further to: identify a set of targeted advertisements from a plurality of current advertisements based on the content presentation profile; select the first targeted advertisement from the set of targeted advertisements; and transmit the first targeted advertisement to the targeted advertisement system.

18. The system of claim 17, wherein the central computer is further to save the first targeted advertisement to the content presentation profile, generating an updated content presentation profile.

19. The system of claim 16, wherein the perception system is to identify a user having the mobile device with the ridehail application based on the sensor data, and track a gaze of the user and determine whether the targeted advertisement was viewed by the user.

20. The system of claim 16, wherein the targeted advertisement system is further to generate a list of viewed advertisements associated with the content presentation profile and transmit the list of viewed advertisements to the central computer.

\* \* \* \* \*